United States Patent [19]

Speca et al.

[11] 4,328,124
[45] May 4, 1982

[54] OLEFIN POLYMERIZATION CATALYST AND PROCESS

[75] Inventors: Anthony N. Speca; Stanley J. Katzen, both of Cincinnati; Louis J. Rekers, Wyoming, all of Ohio

[73] Assignee: National Petro Chemicals Corp., New York, N.Y.

[21] Appl. No.: 228,391

[22] Filed: Jan. 26, 1981

[51] Int. Cl.³ .......................... C08F 4/24; C08F 4/02; C08F 4/16
[52] U.S. Cl. .................................. 252/430; 252/428; 252/431 P; 252/465; 252/429 C; 526/106; 526/100; 526/161
[58] Field of Search .................... 252/428, 430, 431 P, 252/465

[56] References Cited

U.S. PATENT DOCUMENTS

| | | | |
|---|---|---|---|
| 3,984,351 | 10/1976 | Rekers et al. | 252/430 |
| 3,985,676 | 10/1976 | Rekers et al. | 252/430 |
| 4,041,224 | 8/1977 | Hoff et al. | 252/430 |
| 4,234,453 | 11/1980 | Rekers et al. | 252/430 |
| 4,284,527 | 8/1981 | Pullakat et al. | 252/430 |

Primary Examiner—Winston A. Douglas
Assistant Examiner—J. V. Howard
Attorney, Agent, or Firm—Kenneth D. Tremain

[57] ABSTRACT

Olefin polymerization catalysts comprised of a supported adduct of a trialkyl-dialkylphosphato-titanate and chromium trioxide, processes for their preparation and polymerization processes employing the same.

11 Claims, No Drawings

OLEFIN POLYMERIZATION CATALYST AND PROCESS

BACKGROUND OF THE INVENTION

This invention relates to olefin polymerization catalysts and more particularly to supported catalysts comprised of certain titanium-phosphorous-chromium adducts.

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina, and activated by heating in reducing atmospheres, to polymerize olefins. When, however, a catalyst system of this type is used in techniques such as the well-known particle-form process, the resins produced, while useful in many applications, are unsatisfactory for others because of a deficiency in certain properties such as melt index.

Attempts to improve the properties of polyolefins produced using supported, heat-activated chromium oxide catalysts have been made by adding various compounds to the supported chromium oxide prior to the heat activation thereof. For example, U.S. Pat. No. 3,622,522 shows that an alkoxide of gallium or tin may be added to supported chromium oxide prior to heat activation (and compares addition of aluminum isopropoxide unfavorably). U.S. Pat. No. 3,715,321 suggests adding a compound of a Group II-A or Group III-B metal to supported chromium oxide prior to heat treatment, whereas U.S. Pat. No. 3,780,011 discloses adding alkyl esters of titanium, vanadium or boron, and U.S. Pat. No. 3,484,428 discloses adding alkyl boranes to such a catalyst.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287; and in U.S. Pat. No. 3,474,080.

Use of the above chromium compound catalysts in Ziegler-type coordination catalyst systems has also been proposed. As is well-known in the art, such catalysts frequently additionally comprise organometallic reducing agents such as, for example, trialkyl aluminum compounds. Ziegler-type catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500.

Numerous other olefin polymerization catalysts and processes are known. For example, U.S. Pat. No. 4,115,318 discloses the polymerization of alpha-olefins at high levels to desirably high melt index employing a supported hydrated or anhydrous polymeric chromium (III) compound such as poly(di-$\mu$-dihydrocarbylphosphinatohydroxyaquochromium (III)) activated by heat in a nonreducing atmosphere.

U.S. Pat. No. 3,752,795 discloses the polymerization of olefins in the presence of a catalyst system comprised of an organic-solvent-soluble composition prepared by reaction of an organotitanate with a chromium oxide and an organoaluminum compound to form polymers having controllable molecular weight distributions.

In another U.S. Pat. No. 3,985,676 it is disclosed that olefins polymerized in the presence of reaction products of organophosphorus compounds, such as organophosphites or organophosphates, and chromium trioxide produce polymers particularly well adapted for molding operations.

Still others, for example U.S. Pat. Nos. 3,984,351, and 3,969,272, disclose that polyolefins having improved melt indexes and other advantages are prepared with certain supported catalysts comprised of certain chromium or organophosphoryl chromium reaction products and certain aluminum compounds.

Other processes for the production of polyolefins having improved melt indexes are also known. Such a process employing a catalyst system of chromium and titanium is found in U.S. Pat. No. 3,622,521.

U.S. Pat. No. 4,008,359 and U.S. Pat. No. 3,901,825 disclose still another polymerization process wherein products having improved properties are formed. The catalyst system is one formed by mixing a chromium trisdiorgano-orthophosphate, an alkyl aluminum compound and a halogenated olefin. Other chromium and/or titanium compound catalysts useful in olefin polymerization processes are disclosed in U.S. Pat. Nos. 3,970,613, U.S. 4,041,224, 4,035,560, 3,976,632.

SUMMARY OF THE INVENTION

Accordingly, it is one object of the present invention to provide an improved catalyst for the polymerization of olefins.

Another object of this invention is to provide an improved catalyst for the preparation of polyolefins having improved properties.

Still another object of the present invention is to provide an improved catalyst for the preparation of polyolefins having increased melt indexes, as well as other improved properties.

A still further object of this invention is to provide an improved process for the polymerization of olefins utilizing the heretofore mentioned catalysts.

These and other objects are accomplished herein by the discovery that alpha-olefins can be polymerized to polyolefins of desirably high melt index employing as the catalyst the reaction product of a trialkyl-dialkylphosphato-titanate and chromium oxide ($CrO_3$) deposited on a support activated by heating in a non-reducing atmosphere.

DESCRIPTION OF THE PREFERRED EMBODIMENTS

In accordance with this invention, an olefin polymerization catalyst is prepared by reacting a trialkyldialkylphosphato-titanate with chromium trioxide ($CrO_3$), depositing the resultant product upon an inorganic support material having surface hydroxyl groups and calcining the impregnated support material in a non-reducing atmosphere above 300° C. up to the decomposition temperature of the support material to provide an activated catalyst. In another embodiment of the present invention the coated catalyst support may also be modified with a compound of the formula $Al(OR)_3$, wherein R is an alkyl group having 1 to 8 carbon atoms, prior to activation.

The trialkyl-dialkylphosphato-titanate compounds, which are reacted with chromium trioxide, according to this invention, are prepared generally by the reaction of equimolar amounts of a titanium compound of the formula Ti(OR)₄ and a phosphorous compound of the formula:

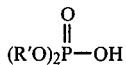

wherein R and R' may be the same or different and are alkyl groups of from 1 to 6 carbon atoms, preferably 1 to 4. Most preferably, R is butyl and R' is ethyl. While not intended to be bound, it is believed that this reaction product has the general formula:

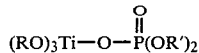

wherein R and R' are as defined hereinabove. The reaction is exothermic and is carried out in a suitable high boiling organic solvent, preferably a hydrocarbon such as toluene and the like. Generally, refluxing is maintained for about 10–20 hours at which time the final product is isolated by evacuating or distilling off the solvents in the reaction vessel.

Accordingly, the novel catalysts of the present invention are prepared by reacting these above-noted trialkyl-dialkylphosphato-titanates with chromium trioxide at room temperature and depositing the reaction product, with or without the co-deposition of an aluminum alkoxide compound, on an inorganic support in any suitable manner such as by vapor coating or by impregnating the support with solutions thereof in a suitable inert solvent. Such organic solvents include aliphatic, cycloalkyl and alkylaryl hydrocarbons and their halogenated derivatives. A preferred organic solvent is dichloromethane. The trialkyldialkylphosphato-titanate/chromium oxide reaction product can be applied to the support first or the aluminum alkoxide can be applied first or the reaction product and aluminum alkoxide can be applied together. It is preferred, however, to first impregnate the support with the reaction product and thereafter impregnate the support with the aluminum compound.

The inorganic support materials which are useful in the present invention include those normally employed in supported chromium catalysts used in olefin polymerizations such as those described in U.S. Pat. No. 2,825,721. Typically, these support materials are inorganic oxides of silica, alumina, silica-alumina mixtures, thoria, zirconia and comparable oxides which are porous and have a medium surface area. Preferred support materials are silica xerogels or xerogels containing silica as the major constituent. Especially preferred are the silica xerogels disclosed and claimed in U.S. Pat. Nos. 3,652,214, 3,652,215 and 3,652,216 which are incorporated by reference herein. These silica xerogels have a surface area in the range of 200 to 500 m²/g, a pore volume greater than about 2.0 cc/g, a major portion of the pore volume being provided by pores having diameters in the range of 300 to 600 A.

The most effective catalysts have been found to be those containing the trialkyl-dialkylphosphatotitanate/chromium oxide adduct in an amount such that the amount of chromium by weight based on the weight of the support is from about 0.25% to about 2.5% and preferably is from about 0.5% to about 1.25%, although amounts outside these ranges can be used to prepare operable catalysts.

After the adduct of trialkyl-dialkylphosphatotitanate and chromium trioxide and, optionally, the aluminum compound have been deposited on the inorganic support, the support is calcined, and heated, in a non-reducing atmosphere, preferably in an oxygen containing atmosphere, at a temperature above about 300° C. up to the decomposition temperature of the support. Typically, the supported compositions are calcined at a temperature of from about 800° C. to about 1000° C. The calcination period can widely vary depending on the calcination temperatures employed and can be from about ½ hour to about 50 hours or more. Generally, calcination is carried out over a period of from about 2 to about 12 hours with approximately 4 to 6 hours being typical. The non-reducing atmosphere, which is preferably air or other oxygen-containing gas, should be dry and preferably should be dehumidified down to a few parts per million (ppm) of water to obtain maximum catalyst activity. Typically, air used in the procedure described in this application is dried to less than 2–3 ppm of water.

The calcined supported cataysts of the present invention can, if desired, be used for combination with known and conventional metallic and/or non-metallic olefin polymerization catalyst components. Thus, for example, the following metallic reducing agents can be used herein: trialkyl aluminums such as triethyl aluminum, triisobutyl aluminum; alkyl aluminum halides; alkyl aluminum alkoxides; dialkyl zinc; dialkyl magnesium; metal borohydrides including those of the alkali metals, especially sodium lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane. The foregoing metallic and non-metallic compounds can be combined with supported catalysts herein prior to being fed to an olefin polymerization reactor or these two components can be fed separately to an olefin polymerization reactor.

In proportioning the amount of metallic or non-metallic compound to the amount of titanium-phosphorous-chromium compound used in the catalyst system of the present invention, fairly wide latitude is available, but some guidelines have been established consistent with good yield, favorable polymer properties and economic use of materials. For example, in the use of metallic and/or non-metallic reducing agents with an amount of the herein chromium compound sufficient to yield about 1% chromium by weight of the support, the parameters set forth below are representative. The atomic ratios are based upon a calculation of the metal in the metallic reducing agent and/or the non-metal in the non-metallic reducing agent versus the chromium content present in the compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratios are from about 0.1/1 to 20/1, and in terms of weight are from about 0.4% to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl borane (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the catalyst compositions of this invention are amenable to use with conventional polymerization processes for olefins, in particular alpha-olefins having 2 to 10 carbon atoms and are suitable for polymerization effected under temperature and pressure conditions generally employed in the art, e.g., temperatures of from about 40° to about 200° C. and preferably from about 70° to 110° C., and pressures of from 200 to 1000 psig and preferably from 300 to 800 psig, as are used in slurry or particle form polymerizations.

More specifically, olefins which are intended to be included in the polymerization process of the present invention include, for example, alpha-olefins of 2 to 10 carbon atoms and 1 or 2 ethylenic linkages, such as, ethylene, propylene, butene-1, isobutylene, alpha-methylstyrene, 2-, 3- or 4-methylstyrene, butadiene-1,3, isoprene, 2-phenylbutadiene-1,3 and 2,3-dimethylbutadiene-1,3. It is also within the scope of this invention to copolymerize the aforesaid alpha-olefins with minor amounts up to 50% by weight of other ethylenically unsaturated monomeric polymerizable compounds. Suitable comonomers are: halogenated styrene; styrenesulfonic acid; alpha, beta-unsaturated carboxylic acids such as acrylic acid and methacrylic acid; esters of acrylic acid with alcohols of from 1 to 8 carbon atoms such as methyl acrylate, ethyl acrylate and n-butyl acrylate; esters of methacrylic acid with alcohols of from 1 to 8 carbons atoms such as methyl methacrylate and tertiary butyl acrylate; vinyl esters of alcohols with 1 to 10 carbon atoms such as vinyl acetate, vinyl propionate and vinyl benzoate; vinyl ethers of alcohols with 1 to 4 carbon atoms such as vinyl methyl ether and vinyl n-butyl ether; vinyl chloride; vinylidene chloride; nitriles and amides of alpha, beta-unsaturated carboxylic acids such as acrylonitrile and methacrylonitrile; acrylamides; methacrylamide; vinyl ketones with 4 to 7 carbon atoms such as methyl vinyl ketones and isopropenyl vinyl ketone; N-vinyl compounds such as vinylpyrrolidone, vinyl caprolactam, vinylimidazole and vinyl carbazole; fumaric acid, maleic acid, maleic anhydride, maleic imide; esters of maleic acid with 1 to 6 carbon atoms such as diethyl maleate, dimethyl maleate, di-n-butyl maleate and the corresponding esters of fumaric acid.

A typical polymerization according to the present invention would be carried out in the following manner: The supported titanium-phosphorous-chromium adduct and aluminum compound where used, and the reducing agent where used, is added along with the isobutane solvent to a stirred one gallon autoclave. The contents of the stirred autoclave are then heated to the polymerization temperature, i.e., 88° to 108° C. Hydrogen is added and then ethylene is added to give 10 mole % in the liquid phase at which time the total pressure will be from about 425 to 450 psig. Polymerization begins almost immediately as noted by the ethylene coming from the ethylene demand supply system to the reactor. After approximately one hour of polymerization, the reaction is terminated by dropping the reactor contents into a pressure let-down system.

The catalysts of the present invention used in the polymerization processes herein are typically prepared in accordance with the following Catalyst Preparation Procedure.

Catalyst Preparation Procedure

A. Generally, the trialkyl-dialkylphosphato-titanate-chromium trioxide adduct according to this invention is prepared by dissolving a compound of the formula:

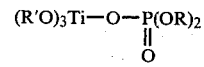

prepared as hereinbefore described wherein R and R' are defined hereinbefore and include methyl, ethyl, propyl, butyl, isobutyl, pentyl etc., in a solvent, such as, methylene dichloride and slowly adding the solution to a flask containing a mixture of chromium trioxide and the same solvent. The reaction mixture is stirred and reaction is permitted to proceed without the application of external heat for about 16 hours. The desired product is then isolated by filtration.

B. Silica gel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of step A above is then added to the flask in sufficient quantity to provide a dry coated catalyst containing about 1% by weight of Cr. The supernatant liquid is removed by filtration and the coated gel is dried in a rotary evaporator at temperatures up to about 60° C. and 29 inches of Hg vacuum.

C. As indicated, in some cases the catalyst is often coated with an aluminum alkoxide, Dichloromethane is added to a similar flask as used in step B and while maintaining a nitrogen atmosphere stirring is commenced. To the flask is added the supported composition prepared in step B above. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C. and 29 inches Hg vacuum. The amount of aluminum compound added depends on the % aluminum desired for the production of olefin polymers having specific properties necessary for certain end use applications.

D. To heat activate the catalyst composition prepared in steps B or C, the supported catalyst is placed in a cylindrical container and fluidized with dry air at 0.20 feet per minute lineal velocity while being heated to a temperature of 900° C. and held at this temperature for six hours. The activated supported catalyst is recovered as a powder.

In order that those skilled in the art may even better understand how the present invention may be practiced, the following specific examples are given by way of illustration and not by way of limitation.

EXAMPLE 1

Catalyst Preparation Procedure

A. A titanium-phosphorous-chromium adduct is prepared by dissolving 3.36 g (8 mmole) of a compound, which is believed to have the formula $$(C_4H_9O)_3-Ti-O-\underset{\underset{O}{\|}}{P}(OC_2H_5)_2$$

(the precise preparation of this compound will be discussed hereafter) in 23.42 g methylene dichloride ($CH_2Cl_2$) and slowly adding the solution under stirring to a 100 ml flask containing 0.8 g $CrO_3$ (8 mmole) and 26.73 g methylene dichloride. The flask is covered with foil to exclude light and the contents stirred overnight.

Inspection of the contents of the flask shows some insoluble material. Filtration is accomplished in the following way. A 2-hole rubber stopper containing a short medicine dropper and a J-shaped dip tube is inserted into the flask. A plug of glasswool is inserted into the J tube to act as a filter. The other end of this tube is positioned into a 250 ml round bottom flask. The $N_2$ line is connected to the dropper. When the bubbler effluent tube is sealed with a small rubber bulb, the $N_2$ pressure forces the reaction mixture into the dip tube, thus filtering out the insolubles and transporting the filtrate into the flask. After rinsing several times with $CH_2Cl_2$, the $N_2$ flow is reversed and the system dried. Reweighing shows that 0.10 g insoluble material remained in the J-tube and reaction flask. Thus, the solution contains 0.70 g $CrO_3$ in a solubilized form.

40.4 g of POLYPOR silica gel is slurried with 350 g $CH_2Cl_2$ and the 40.4 g is coated with the above filtered solution. After 0.5 hr stirring the gel is dried at 60°/70° C. and about 20 mm Hg. The dried gel is stored under $N_2$.

The gel is divided into two portions the first is bottled and activated according to the procedure described hereinbefore. The remainder, 23.11 g, is slurried with 200 ml $CH_2Cl_2$ for coating at 3.7% Al, 7.81 g Al sec-butoxide is diluted with about 15 g $CH_2Cl_2$ and slowly added to the stirred slurry. After 0.5 hr. stirring, the gel is dried at 40°/50° C. and 30 mm Hg. The dried gel is bottled and is activated according to the procedure described hereinbefore.

The $$(C_4H_9O)_3-Ti-O-\underset{\underset{O}{\|}}{P}(OC_2H_5)$$

compound employed hereinabove is prepared by charging 3.08 g (20 mmole) of $$\underset{\underset{}{}}{\overset{O}{\|}}{(C_2H_5O)_2P-OH}$$

(diethylphosphate) into a one neck 100 ml. flask containing a bar magnet. 6.8 g (20 mmole) of $Ti(OC_4H_9)_4$ (tetrabutyl titanate) is added (heat evolves) followed by 42.6 g toluene. The flask is equipped with a distillation head permitting reflux or distillation via a stopcock sealed drain. The contents of the flask are refluxed for 17 hours. The solvent and other volatile reaction by products (e.g. butanol) may be removed by distillation or evaporation in a Roto-Vac at room temperature. Reflux temperature is 104.6° C. initially and 106.9° C. before distillation begins. After solvent removal by evaporation in a Roto-Vac for 2 hours at room temperature, 8.76 g. of product are recovered. Infra-red analysis of the product shows the disappearance of the P-OH bond, while gas chromatograph analysis of a portion of the distillate fraction shows n-butanol as a by-product, indicating the occurrence of the reaction leading to the compound of the formula $$(C_4H_9O)_3-Ti-O-\underset{\underset{O}{\|}}{P}(OC_2H_5).$$

EXAMPLE 2

The coated catalysts of Example 1 above are employed in a series of ethylene polymerizations summarized in the Table below. All the polymerizations are carried out at 210° F. and with hydrogen at a pressure of 30 psi. Triethyl borane is added to the reactor as indicated.

TABLE

| Catalyst | B/Cr Atomic Ratio | g PE/g Catalyst/Hr. | Polyethylene (PE) Properties | | |
|---|---|---|---|---|---|
| | | | MI | HLMI | HLMI/MI |
| $CrO_3 + (C_2H_5O)_2\overset{O}{\underset{\|}{P}}-O-Ti(OC_4H_9)_3$ | 3/1 | 614 | .35 | 28 | 80 |
| ibid. | 3/1 | 750 | .30 | 26.8 | 89.3 |
| ibid + 3.7% Al | 3/1 | 764 | 5.1 | 420 | 82 |
| ibid | 3/1 | 697 | 12.5 | 712 | 57 |

The melt index (MI) and the high load melt index (HLMI) are determined using ASTM D-1238 (conditions E and F respectively).

The substitution of other alpha-olefins, such as propylene and butene, for ethylene, in the above polymerization reaction also provides desirable polymers.

Obviously, other modifications and variations of the present invention are possible in light of the above-teachings. It is therefore to be understood that changes may be made in the particular embodiments of this invention which are within the full intended scope of the invention as defined by the appended claims.

What is claimed is:

1. An olefin polymerization catalyst comprising an inorganic support material having deposited thereon the reaction product of (i) a trialkyl-dialkylphosphato-titanate prepared from the reaction of

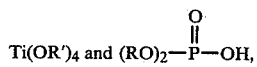

wherein R and R' are the same or different and are alkyl of from 1 to 6 carbon atoms and (ii) chromium trioxide, and heat activated in a non-reducing atmosphere at a temperature of from 200° F. up to the decomposition temperature of the support.

2. A catalyst according to claim 1, wherein an aluminum alkoxide is also deposited upon the inorganic support material prior to heat activation.

3. A catalyst according to claim 1, wherein R' is butyl and R is ethyl.

4. A catalyst according to claim 1, wherein the inorganic support material is a silica xerogel having a surface area in the range of about 200 to about 500 m$^2$/g, a pore volume greater than about 2.0 cc/g and a major portion of the pore volume being provided by pores having diameters in the range of 300 to 600 A.

5. A catalyst according to claim 2 wherein the aluminum alkoxide is aluminum sec-butoxide.

6. A process for the preparation of an olefin polymerization catalyst, which comprises the steps of:
(a) depositing the reaction product of (i)

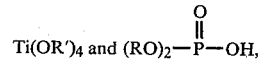

wherein R and R' are the same or different and are alkyl of from 1 to 6 carbon atoms, with (ii) chromium trioxide, upon an inorganic support material; and (b) heating said support material having said reaction product deposited thereon in a nonreducing atmosphere at a temperature of from 200° F. up to the decomposition of the support material.

7. A process according to claim 6 wherein an aluminum alkoxide is also deposited upon the inorganic support material prior to the heating step.

8. A process according to claim 6 wherein R' is butyl and R is ethyl.

9. A process according to claim 6, wherein the inorganic support material is a silica xerogel having a surface area in the range of about 200 to about 500 m$^2$/g, a pore volume greater than about 2.0 cc/g and a major portion of the pore volume being provided by pores having diameters in the range of 300 to 600 A.

10. A process according to claim 7 wherein the aluminum alkoxide is aluminum sec-butoxide.

11. A process according to claim 6 wherein the heat-treated polymerization catalyst is combined with a metallic or non-metallic reducing agent, the metallic reducing agent being selected from the group consisting trialkyl aluminum, alkyl aluminum halides, alkyl aluminum alkoxides, dialkyl zinc, dialkyl magnesium, and the alkali metal and magnesium, beryllium and aluminum borohydrides, and the non-metallic reducing agent being selected from the group consisting of alkyl boranes and hydrides.

* * * * *